United States Patent [19]

Buchanan et al.

[11] Patent Number: 5,108,959
[45] Date of Patent: Apr. 28, 1992

[54] TERBIUM ACTIVATED BORATE LUMINESCENT GLASSES COACTIVATED WITH GADOLINIUM OXIDE

[75] Inventors: Robert A. Buchanan, Palo Alto; Clifford Bueno, Sunnyvale, both of Calif.; Harold Berger, Gaithersburg, Md.

[73] Assignee: Lockheed Missiles & Space Company, Inc., Sunnyvale, Calif.

[21] Appl. No.: 614,190

[22] Filed: Nov. 16, 1990

[51] Int. Cl.$^5$ ................................................ C03C 3/15
[52] U.S. Cl. ............................. 501/50; 252/301.4 H; 252/301.4 R; 250/483.1; 378/140
[58] Field of Search .................. 501/13, 27, 50, 49; 252/301.4 H, 301.4 R; 428/426, 427, 690; 378/121, 140

[56] References Cited

U.S. PATENT DOCUMENTS

| | | | |
|---|---|---|---|
| 4,225,653 | 9/1980 | Brixner | 428/539 |
| 4,233,538 | 11/1980 | Van de Spijker et al. | 313/486 |
| 4,297,584 | 10/1981 | Buchanan et al. | 250/483 |
| 4,751,148 | 6/1988 | Popma et al. | 428/690 |
| 4,798,768 | 1/1989 | Oversluizen et al. | 428/426 |

Primary Examiner—William R. Dixon, Jr.
Assistant Examiner—Alan Wright
Attorney, Agent, or Firm—Richard H. Bryer

[57] ABSTRACT

This invention relates to terbium activated borate luminescent glasses exhibiting enhanced x-ray absorption characteristics and conversion of absorbed energy into green light due to incorporation therein of gadolinium oxide.

27 Claims, No Drawings

TERBIUM ACTIVATED BORATE LUMINESCENT GLASSES COACTIVATED WITH GADOLINIUM OXIDE

The Government has rights in this invention pursuant to Contract N60530-87-C-008 awarded by the Department of the Navy.

TECHNICAL FIELD

This invention relates to terbium activated borate luminescent glasses exhibiting enhanced x-ray absorption characteristics and improved conversion of this absorbed energy into green light in the x-ray energy range from about 5 keV to about 25 MeV.

BACKGROUND OF THE INVENTION

Terbium activated luminescent glass and fiber optic luminescent glass x-ray detection plates are promising alternatives to polycrystalline phosphor screens in high energy x-ray (>100 kV) electronic radiographic systems. These devices have recently been shown to provide images with improved spatial resolution and enhanced contrast sensitivity in these applications compared to the polycrystalline phosphor screens (see L. M. Klynn, and R. C. Barry, et al. "High Resolution Real-Time Radiography System Design" final report AF Contract F33615-83-C-5087, AFWAL-TR-87-4055, Jul. 1987).

The important characteristics to optimize in luminescent glass design to obtain further improvements in these systems are (1) a high x-ray absorption efficiency and (2) a high conversion of this absorbed energy into light for capture by a suitable light detector or camera.

To obtain high x-ray absorption efficiency in the 50 keV to 15 MeV energy regime typically employed for the purpose of nondestructive testing, the glass must have high density, a high effective atomic number (Z), and optimum thickness. To achieve a high x-ray-to-light conversion efficiency the terbium must provide a strong luminescence in the host employed. In some cases, due to poor host/activator interaction, making the glasses heavy to absorb x-rays reduces the x-ray-to-light conversion efficiency of the material. This has been observed for PbO, $Sb_2O_3$, $Fe_2O_3$, ZnO, $As_2O_3$, $HfO_2$, $Nb_2O_5$ or $Ta_2O_5$ addition to terbium activated luminescent glass (U.S. Pat. No. 3,654,172, "Terbium Activated Radioluminescent Silicate Glass", Apr. 4, 1972). Conversely, low Z glasses have shown high x-ray-to-light conversion, but poor x-ray absorption characteristics. For example, a luminescent terbium-activated lithium beryllium borate glass has been suggested for use under x-ray excitation in Ger. Offen. DE 2500910, Dec. 9, 1976. Obtaining both is the subject of this application.

Because of their high ultraviolet quantum yields, many terbium activated borate luminescent glass compositions have been developed for use under ultraviolet excitation in fluorescent lamps. Some have moderately high Z and density and it could be expected that these materials would be useful x-ray detection materials. However, these materials frequently do not perform well under x-rays. There are subtle energy transfer processes occurring under x-rays that do not occur under ultraviolet excitation. As x-ray energy is deposited into these materials, electrons and holes are generated throughout the host glass matrix. The incorporation of ions into the glass that alter the electronic nature of the host matrix can result in trapping of this energy or reduced transport of this energy. Both processes will inhibit the excitation of the activator ions. Under ultraviolet radiation, the activator can directly capture the ultraviolet energy. This reduces the interaction between the host glass ions and the activator ions. For these reasons, luminescent glasses that are useful for applications that employ ultraviolet excitation processes, will often not be useful for application under x-rays. Even co-activator (sensitizer) ions that are included into glass compositions to improve the response of the primary activator under uv excitation may quench the response this glass has under x-ray excitation.

Illustratively, in European Patent 338934, dated Oct. 25, 1989, and French Patent 2630430 dated Oct. 27, 1989, The inventors report that a terbium activated rare-earth borate glass sensitized with MnO has a high white luminescent response under ultraviolet radiation. However, we have found this material to have a rather weak green luminescent response under x-rays. In JP 58/69740 A2 [83/69740], dated Apr. 26, 1983, a $Eu^{3+}$ sensitized terbium activated rare-earth borate glass has a response that is similarly quenched under x-ray excitation. This patent, however, covers a very broad range of constituents with no particular utility. We have found that when we tried to prepare glass materials from some of their compositions with gadolinium oxide concentrations between 15 and 20 mole %, these materials devitrified after removal from the hot zone and casting, and glasses could not be formed.

At the current state of knowledge in the design of x-ray to light conversion screens for radiographic applications, it is still not possible to predict with assurance which constituents will improve or hinder the x-ray response of a material.

SUMMARY OF THE INVENTION

Briefly, in accordance with the invention, large levels of gadolinium oxide have been incorporated into terbium activated borate glass matrices to improve both the x-ray-to-light conversion efficiency and the x-ray absorption efficiency in this luminescent system.

More particularly, the terbium activated borate luminescent system.

More particularly, the terbium activated borate luminescent glasses coactivated with gadolinium oxide contain, in mole % of oxide, 64 to 72 percent $B_2O_3$; 0 to 3 percent $SiO_2$; a total MO content no greater than 18% where MO equals 8 to 18 percent CaO and 0 to 9 percent BaO, a total $Re_2O_3$ content no greater than 20 percent where $Re_2O_3$ equals 0.5 to 5 percent $Tb_2O_3$, 9 to 15 percent $Gd_2O_3$ and 0 to 3 percent $La_2O_3$.

To be assured of a high efficiency under x-rays, the glasses preferably contain, in mole percent, 1 to 3 percent $Tb_2O_3$ and 12 to 14 percent $Gd_2O_3$.

BEST MODE OF CARRYING OUT THE INVENTION

The applicants have found that large levels of gadolinium oxide can be incorporated into terbium activated luminescent glass materials to improve both the x-ray-to-light conversion efficiency and the x-ray absorption efficiency. This invention can be demonstrated by reference to specific examples.

The glass materials are prepared by mixture of powdered batch components that upon fusion result in a glassy matrix of the metal oxides in the ratios desired. These components are to have a purity of 99.9 percent or higher. The mixtures are melted in air between 1270°

C. and 1400° C. in either platinum or high purity aluminum oxide crucibles, or under nitrogen or argon in vitreous carbon crucibles. The glasses are poured, annealed, ground and polished to a thickness of 3/8 in. for evaluation.

Table 1 provides examples of gadolinium oxide enriched terbium activated borate glasses, their densities, and their relative x-ray-to-light conversion efficiencies in relation to a glass that has the gadolinium oxide completely replaced by lanthanum oxide (Ex. 1).

The density is measured using the Archimedean method. The x-ray-to-light conversion efficiencies are obtained by measurement of their photopic luminescent response under 20 kV x-rays employing a shielded photometer. Measurements at this energy on these relatively thick materials yields the relative luminescent efficiency the materials have under complete (100 percent) x-ray absorption, and eliminates the need for an x-ray absorption correction. Each material in Table 1 has the same green emission spectrum and, therefore, no additional photometer correction is required to the x-ray luminescence data. It is important to note that since the materials in this study absorb the same amount of x-ray energy, any difference in luminescent response is due directly to their efficiency in converting this energy into light.

are related exponentially by the linear attenuation coefficient of the material and its thickness. The linear attenuation coefficient is related to the density of the material and to the atomic number of the material. At low energies (<400 kV) the attenuation coefficient can increase by $Z^4$ for changes in material composition. Table 2 provides the linear attenuation coefficients (1/cm) for 10 keV, 100 keV, 200 keV, 300 keV, and 400 keV x-ray energies for examples 1–4. In parenthesis are the relative improvement factors of the invention for attenuation at each of these energies. Table 2 demonstrates that the attenuation of example 4 can be as high as 167 percent that of the gadolinium free glass, example 1, in the 10–100 keV x-ray energy regime typically employed in radiographic applications. These results indicate that the addition of large levels of trivalent gadolinium ions into terbium activated borate luminescent glasses improves the x-ray absorption characteristics of these materials through increased atomic number and density, while enhancing the conversion of the energy into light through subtle energy transfer processes.

Table 1 also illustrates that addition of low levels of $SiO_2$ (Ex. 3) substantially improve the x-ray-to-light conversion efficiency without degrading x-ray absorption. Conversely, moderate levels of BaO (Ex. 4) can be included in the glass to increase the density and attenua-

TABLE 1

| Example | $La_2O_3$ | $Gd_2O_3$ | $B_2O_3$ | $SiO_2$ | CaO | BaO | $Tb_2O_3$ | $\rho$ (g/cm$^3$) | Rel Conv Efficiency |
|---------|-----------|-----------|----------|---------|------|------|-----------|-------------------|---------------------|
| 1 | 12.5 |      | 67.7 |     | 17.8 |     | 2.0 | 3.62 | 100 |
| 2 |      | 12.5 | 67.7 |     | 17.8 |     | 2.0 | 3.91 | 187 |
| 3 |      | 15.0 | 65.2 | 2.5 | 15.3 |     | 2.0 | 3.85 | 244 |
| 4 | 2.0  | 12.5 | 67.0 |     | 8.9  | 8.9 | 2.0 | 4.11 | 187 |

Table 1 illustrates that addition of complete or near complete substitution of $La_2O_3$ by $Gd_2O_3$ results in tion of the glass without effecting its efficiency for conversion.

TABLE 2

| | CALCULATED LINEAR X-RAY ATTENUATION COEFFICIENTS (1/CM) AND RELATIVE IMPROVEMENT OF INVENTION (%) | | | | | | | | |
|---|---|---|---|---|---|---|---|---|---|
| | At 10 keV | | At 100 keV | | At 200 keV | | At 300 keV | | At 400 keV | |
| Example | (1/cm) | (%) | (1/cm) | (%) | (1/cm) | (%) | (1/cm) | (%) | (1/cm) | (%) |
| 1 | 338 | (100) | 3.82 | (100) | 0.89 | (100) | 0.51 | (100) | 0.39 | (100) |
| 2 | 498 | (147) | 5.49 | (144) | 1.17 | (131) | 0.62 | (122) | 0.45 | (115) |
| 3 | 530 | (157) | 5.87 | (154) | 1.22 | (137) | 0.64 | (125) | 0.46 | (118) |
| 4 | 564 | (167) | 6.37 | (166) | 1.31 | (147) | 0.68 | (133) | 0.48 | (123) | approximately a 2-fold increase in conversion efficiency. This increased x-ray conversion efficiency from gadolinium addition was a completely unexpected result. Under ultraviolet excitation in the 220–380 nm regime we have noted that the increase in luminescence efficiency by terbium due to the addition of gadolinium in these materials in only about 10 percent. An explanation for this difference in increased efficiencies is that under ultraviolet excitation, energy is deposited by direct excitation into the gadolinium and terbium ions. On the other hand, x-ray energy deposition is indirect into the activators, with electron/hole pairs produced that dominate the excitation processes. For these reasons, successful predictions of increased energy efficiency under x-ray excitation has proved to be rather difficult to achieve for a designed material. Therefore, in these materials it was non-obvious that the added gadolinium would produce such a dramatic effect.

A second advantage, of equal importance, is that the addition of gadolinium in the amounts dictated by this invention further enhanced the x-ray absorption capabilities of the glass. The x-ray absorption characteristics It is obvious to those experienced in the art of luminescent glass that addition of small levels ($\leq 2$ mol %) of alkali metal oxides, $Al_2O_3$ or other glass modifier ions can be substituted for non-rare-earth constituents in these compositions for the purpose of glass production requirements. Other glass formers such as $P_2O_5$ and heavy metal fluoride glass formers can also be substituted for $B_2O_3$ in levels below 2 mol %.

It should also be obvious to those experienced with the art that these materials can be used in other forms such as ground glass, plates or fiber optics for detection of other electromagnetic radiation such as ultraviolet frequencies in fluorescent lamps, electron beam radiation in cathode ray tubes and as thermal or epithermal neutron detectors for applications such as radiography or dosimetry.

The addition of low levels of $Ce^{3+}/Ce^{4+}$ ions diluted into the composition, where total $C^{3+}/Ce^{4+}$ concentrations are between 0.05–1.0 mole %, can reduce the trapping/detrapping (electron/hole pair trapping and detrapping) in the glass. This reduced trapping/detrapping from this addition results in reduced x-ray induced afterglow, signal build-up and signal instability and reduced x-ray induced darkening of the glass.

What is claimed is:

1. A luminescent, terbium activated borate glass containing, in mole percent oxide, about 64 to 72 percent $B_2O_3$, 0.5 to 5 percent $Tb_2O_3$, 9 to 15 percent $Gd_2O_3$ and up to 2 percent $Al_2O_3$.

2. A glass in accordance with claim 1 wherein said $Tb_2O_3$ is present, in mole percent oxide, from about 1 to 3 percent.

3. A glass in accordance with claim 1 wherein said $Gd_2O_3$ is present, in mole percent oxide, from about 12 to 14 percent.

4. A luminescent, terbium activated borate glass containing, by mole percent oxide, 64 to 72 percent $B_2O_3$; 0 to 3 percent $SiO_2$; a total MO content no greater than 18 percent where MO consists of 8 to 18 percent CaO and 0 to 9 percent BaO; a total $Re_2O_3$ content no greater than 20 percent where $Re_2O_3$ consists of 0.5 to 5 percent $Tb_2O_3$, 9 to 15 percent $Gd_2O_3$ and 0 to 3 percent $La_2O_3$; and up to 2 percent $Al_2O_3$.

5. A glass in accordance with claim 4 wherein said $Tb_2O_3$ is present, in mole percent oxide, from about 1 to 3 percent.

6. A glass in accordance with claim 4 wherein said $Gd_2O_3$ is present, in mole percent oxide, from about 12 to 14 percent.

7. An x-ray conversion screen consisting essentially of a luminescent, terbium activated borate glass containing, in mole percent oxide, about 64 to 72 percent $B_2O_3$, 0.5 to 5 percent $Tb_2O_3$; 9 to 15 percent $Gd_2O_3$ and up to 2 percent $Al_2O_3$.

8. An x-ray conversion screen consisting essentially of a luminescent, terbium activated borate glass containing, by mole percent oxide, 64 to 72 percent $B_2O_3$; 0 to 3 percent $SiO_2$; a total MO content no greater than 18 percent where MO consists of 8 to 18 percent CaO and 0 to 9 percent BaO; and a total $Re_2O_3$ content no greater than 20 percent where $Re_2O_3$ consists of 0.5 to 5 percent $Tb_2O_3$, 9 to 15 percent $Gd_2O_3$; 0 to 3 percent $La_2O_3$; and up to 2 percent $Al_2O_3$.

9. An x-ray conversion screen consisting essentially of fiber optic scintillating plates of a luminescent terbium activated borate glass containing, in mole percent oxide, about 64 to 72 percent $B_2O_3$, 0.5 to 5 percent $Tb_2O_3$, 9 to 15 percent $Gd_2O_3$; and up to 2 percent $Al_2O_3$.

10. An x-ray conversion screen consisting essentially of fiber optic scintillating plates of a luminescent terbium activated borate glass containing, by mole percent oxide, 64 to 72 percent $B_2O_3$; 0 to 3 percent $SiO_2$; a total MO content no greater than 18 percent where MO consists of 8 to 18 percent BaO and 0 to 9 percent BaO; a total $Re_2O_3$ content no greater than 20 percent where $Re_2O_3$ consists of 0.5 to 5 percent $Tb_2O_3$, 9 to 15 percent $Gd_2O_3$ and 0 to 3 percent $La_2O_3$; and up to a 2 percent $Al_2O_3$.

11. In an x-ray intensifier tube, an input screen consisting essentially of fiber optic scintillating plates of a luminescent terbium activated borate glass containing, in mole percent oxide, about 64 to 72 percent $B_2O_3$, 0.5 to 5 percent $Tb_2O_3$; 9 to 15 percent $Gd_2O_3$; and up to 2 percent $Al_2O_3$.

12. In an x-ray intensifier tube, an input screen consisting essentially of fiber optic scintillating plates of a luminescent terbium activated borate glass having a composition in accordance with claim 10.

13. In an x-ray radiographic film cassette, an input screen consisting essentially of fiber optic scintillating plates of a luminescent terbium activated borate glass containing, in mole percent oxide, about 64 to 72 percent $B_2O_3$, 0.5 to 5 percent $Tb_2O_3$; 9 to 15 percent $Gd_2O_3$, and up to 2 percent $Al_2O_3$.

14. In an x-ray radiographic film cassette, an input screen consisting essentially of fiber optic scintillating plates of a luminescent terbium activated borate glass having a composition in accordance with claim 10.

15. In an x-ray radiographic film cassette, an input screen consisting of essentially of ground luminescent terbium activated borate glass containing, in mole percent, about 64 to 72 percent $B_2O_3$, 0.5 to 5 percent $Tb_2O_3$ 9 to 15 percent $Gd_2O_3$, and up to 2 percent $Al_2O_3$.

16. In an x-ray radiographic film cassette, an input screen consisting essentially of ground luminescent terbium activated borate glass having a composition in accordance with claim 8.

17. In x-ray electronic radiography systems, an input glass x-ray conversion screen consisting essentially of a luminescent terbium activated borate glass containing, in mole percent oxide, about 64 to 72 percent $B_2O_3$, 0.5 to 5 percent $Tb_2O_3$, 9 to 15 percent $Gd_2O_3$, and up to 2 percent $Al_2O_3$.

18. In x-ray electronic radiography systems, an input glass x-ray conversion screen consisting essentially of a luminescent terbium activated borate glass having a composition in accordance with claim 8.

19. In fluorescent lighting tubes, a luminescent material consisting essentially of ground luminescent terbium activated borate glass containing, in mole percent, about 64 to 72 percent $B_2O_3$, 0.5 to 5 percent $Tb_2O_3$, 9 to 15 percent $Gd_2O_3$, and up to 2 percent $Al_2O_3$.

20. In fluorescent lighting tubes, a luminescent material consisting essentially of a luminescent terbium activated borate glass having a composition in accordance with claim 8.

21. A thermal neutron conversion screen consisting essentially of a luminescent terbium activated borate glass containing, in mole percent, about 64 to 72 percent $B_2O_3$, 0.5 to 5 percent $Tb_2O_3$, 9 to 15 percent $Gd_2O_3$, and up to 2 percent $Al_2O_3$.

22. A thermal neutron conversion screen consisting essentially of fiber optic scintillating plates of a luminescent terbium activated borate glass containing, in mole percent, about 64 to 72 percent $B_2O_3$, 0.5 to 5 percent $B_2O_3$, 9 to 15 percent $Gd_2O_3$, and up to 2 percent $Al_2O_3$.

23. In a thermal neutron intensifier tube, an input screen consisting essentially of fiber optic scintillating plates of a luminescent terbium activated borate glass containing, in mole percent, about 64 to 72 percent $B_2O_3$, 0.5 to 5 percent $Tb_2O_3$, 9 to 15 percent $Gd_2O_3$, and up to 2 percent $Al_2O_3$.

24. In a thermal neutron radiographic film cassette, an input screen consisting essentially of fiber optic scintillating plates of a luminescent terbium activated borate glass containing, in mole percent oxide, about 64 to 72 percent $B_2O_3$, 0.5 to 5 percent $Tb_2O_3$, 9 to 15 percent $Gd_2O_3$, and up to 2 percent $Al_2O_3$.

25. In thermal neutron electronic radiographic systems, an input glass thermal neutron conversion screen consisting essentially of a luminescent terbium activated borate glass containing, in mole percent oxide, about 64 to 72 percent $B_2O_3$, 0.5 to 5 percent $Tb_2O_3$, 9 to 15 percent $Gd_2O_3$, and up to 2 percent $Al_2O_3$.

26. A method of converting incident radiation into radiation in the visible spectrum comprising the steps of (a) positioning in said incident radiation field a luminescent terbium activated borate luminescent glass containing, in mole percent oxide, about 64 to 72 percent $B_2O_3$, 0.5 to 5 percent $Tb_2O_3$, 9 to 15 percent $Gd_2O_3$, and up to 2 percent $Al_2O_3$, and (b) irradiating said glass with said incident radiation, thereby to convert said incident radiation into said visible radiation.

27. A method of converting incident radiation into radiation in the visible spectrum comprising the steps of (a) positioning in said incident radiation field a fiber optic scintillating plate of a luminescent terbium activated borate glass containing, in mole percent oxide, about 64 to 72 percent $B_2O_3$, 0.5 to 5 percent $Tb_2O_3$, 9 to 15 percent $Gd_2O_3$, and up to 2 percent $Al_2O_3$, and (b) irradiating said plate with said incident radiation, thereby to convert said incident radiation into said visible radiation.

* * * * *